US012559975B2

(12) United States Patent
Yeh et al.

(10) Patent No.: US 12,559,975 B2
(45) Date of Patent: Feb. 24, 2026

(54) JOBSITE BOX WITH KEYLESS ENTRY

(71) Applicant: WERNER CO., West Middlesex, PA (US)

(72) Inventors: Kevin Yeh, Glen Elleyn, IL (US); Milos V. Coric, Lincolnshire, IL (US); Nathan Marshall, Elgin, IL (US); Thomas Parker, Jamestown, PA (US); Sang Oh, Lake Zurich, IL (US); Michael Gong, Hoffman Estates, IL (US); Robert A. Bergum, Woodstock, IL (US)

(73) Assignee: Werner Co., Itasca, IL (US)

( * ) Notice: Subject to any disclaimer, the term of this patent is extended or adjusted under 35 U.S.C. 154(b) by 162 days.

(21) Appl. No.: 18/085,237

(22) Filed: Dec. 20, 2022

(65) Prior Publication Data

US 2023/0228121 A1 Jul. 20, 2023

Related U.S. Application Data

(60) Provisional application No. 63/291,570, filed on Dec. 20, 2021.

(51) Int. Cl.

| | |
|---|---|
| ***E05B 47/00*** | (2006.01) |
| ***E05B 65/52*** | (2006.01) |
| ***G07C 9/00*** | (2020.01) |

(52) U.S. Cl.

CPC ...... *E05B 47/0001* (2013.01); *E05B 65/5238* (2013.01); *G07C 9/00817* (2013.01);

(Continued)

(58) Field of Classification Search

CPC ......... E05B 47/0001; E05B 2047/0058; E05B 2047/0095; E05B 65/523; E05B 65/52;

(Continued)

(56) References Cited

U.S. PATENT DOCUMENTS 4,083,424 A 4/1978 Von Den Stemmen et al.
4,207,555 A * 6/1980 Trombly ............ G07C 9/00182 235/382.5

(Continued)

FOREIGN PATENT DOCUMENTS

AU 2006100488 B9 3/2010
CN 2700494 Y 5/2005

(Continued)

OTHER PUBLICATIONS

Milwaukee Tool, Digital Electronic Cabinet Lock User Guide, 2021.

(Continued)

*Primary Examiner* — Steven A Tullia

(74) *Attorney, Agent, or Firm* — Michael Best & Friedrich LLP

(57) ABSTRACT

A jobsite box includes a body, the body having an interior, an exterior, and a lid, a key pad positioned on the exterior of the body, the key pad being in communication with a controller positioned on the body, a locking mechanism connected to the body, the locking mechanism being configured to lock and unlock the jobsite box, a battery positioned in the interior of the body, the battery configured to power the locking mechanism. The controller is configured to lock or unlock the locking mechanism when a predetermined code is entered into the key pad.

19 Claims, 9 Drawing Sheets

(52) U.S. Cl.
CPC ................. *E05B 2047/0058* (2013.01); *E05B 2047/0086* (2013.01); *E05B 2047/0095* (2013.01); *G07C 2009/00825* (2013.01)

(58) Field of Classification Search
CPC ........ E05B 2047/0086; G07C 9/00817; G07C 2009/00825; B25H 3/02
USPC ......................................................... 70/278.1
See application file for complete search history.

(56) References Cited

U.S. PATENT DOCUMENTS 4,866,963 A 9/1989 Leininger et al.
4,921,122 A * 5/1990 Bornstein ................. E05C 9/02 220/326
4,926,664 A * 5/1990 Gartner ............... E05B 47/0603 70/278.7
5,020,345 A * 6/1991 Gartner ............... E05B 47/0012 70/277
5,161,396 A * 11/1992 Loeff .................... E05B 47/026 70/279.1
5,351,512 A 10/1994 Pearlman
5,727,835 A 3/1998 Krush et al.
5,778,805 A 7/1998 Green
5,852,944 A * 12/1998 Collard, Jr. ........... E05B 47/026 292/144
5,933,086 A * 8/1999 Tischendorf ....... G07C 9/00817 340/5.64
6,065,408 A * 5/2000 Tillim ..................... E05G 1/005 109/38
6,089,168 A * 7/2000 Dunlap ................... E05G 1/026 292/159
6,116,067 A * 9/2000 Myers ................... E05B 65/462 70/279.1
6,130,621 A * 10/2000 Weiss ................. G07C 9/00182 312/333
6,345,522 B1 * 2/2002 Stillwagon .......... E05B 47/0603 292/341.16
6,374,649 B1 * 4/2002 Holcomb ........... G07C 9/00182 312/215
6,409,064 B1 6/2002 Bayley
6,681,604 B1 * 1/2004 Samsel ................. E05B 65/025 312/219
6,825,753 B2 * 11/2004 Cardinale ............. E05B 43/005 70/278.1
6,883,440 B1 * 4/2005 Correia ..................... E05G 1/04 70/1.5
7,334,443 B2 * 2/2008 Meekma ............. E05B 47/0673 70/276
7,363,786 B2 4/2008 Terhaar et al.
7,484,391 B1 2/2009 Moore
7,516,632 B2 4/2009 Poppell
8,284,023 B2 * 10/2012 Coutermarsh ........ E05B 47/026 70/277
8,342,580 B2 * 1/2013 Cowie .................... B65D 43/22 292/148
8,684,421 B2 * 4/2014 Cowie ....................... E05C 9/02 292/148
8,720,239 B2 5/2014 Crass et al.
8,869,576 B2 10/2014 O'Leary et al.
8,876,172 B2 * 11/2014 Denison .................... G07F 5/26 292/144
8,922,367 B2 * 12/2014 Denny ................... G16H 20/13 604/59
9,085,919 B2 * 7/2015 Bacon ..................... E05B 81/77
9,151,078 B2 10/2015 Lackey
9,327,887 B2 * 5/2016 Farentinos ............. B65D 55/14
9,418,497 B2 * 8/2016 Ingle .................. G07C 9/00912
9,423,211 B2 * 8/2016 Ho ........................ E05B 37/163
9,574,375 B2 * 2/2017 Henderson ........... G07C 9/0069
9,697,663 B2 * 7/2017 Johnson ............. G07C 9/00571
9,876,387 B2 * 1/2018 Geiszler .................. H02J 50/20
9,901,170 B2 2/2018 Tam
10,089,811 B2 * 10/2018 Ufkes ................. E05B 47/0004
10,135,288 B2 * 11/2018 Geiszler .................. H01F 38/14
10,253,527 B2 * 4/2019 Beasley .............. E05B 65/0075
10,253,529 B1 * 4/2019 McGinn .................. E05B 51/00
10,453,285 B2 * 10/2019 Steinmetz .......... G07C 9/00309
10,753,122 B2 * 8/2020 Wegener ............ G07C 9/00912
10,925,425 B2 * 2/2021 Chenier ............. G07C 9/00309
11,302,126 B2 * 4/2022 Stevenot .............. A47G 29/141
11,369,222 B2 * 6/2022 Kennett .................. E05B 47/00
11,759,040 B2 * 9/2023 Richardson ........ G06Q 10/0836 705/332
2001/0050615 A1 * 12/2001 Kucharczyk .............. G07F 7/10 340/568.1
2004/0061591 A1 * 4/2004 Teich ................. G07C 9/00817 340/5.24
2006/0230795 A1 * 10/2006 Kroening .................. E05C 9/08 70/159
2006/0237427 A1 * 10/2006 Logan ...................... G07C 9/37 219/401
2007/0040401 A1 2/2007 Poole
2007/0044524 A1 3/2007 Coutermarsh et al.
2007/0210600 A1 9/2007 Young
2007/0266081 A1 * 11/2007 Murchison, III ....... G07F 17/13 709/203
2008/0150676 A1 6/2008 Ennis et al.
2009/0201198 A1 * 8/2009 Moudy .............. G06Q 30/0279 705/329
2010/0223966 A1 9/2010 Ennis et al.
2011/0087370 A1 * 4/2011 Denison ................... G07C 9/27 221/9
2011/0203328 A1 * 8/2011 Vilkomirski ........ E05B 47/0657 70/57.1
2012/0291502 A1 11/2012 Frankham et al.
2013/0119063 A1 * 5/2013 Cowie ....................... E05C 9/02 220/315
2013/0144428 A1 * 6/2013 Irwin ...................... G07F 17/10 700/218
2013/0264168 A1 * 10/2013 Usem ...................... G07F 17/12 194/202
2014/0167425 A1 6/2014 Dost et al.
2014/0210592 A1 7/2014 Van Wiemeersch
2015/0120601 A1 * 4/2015 Fee .................... G06Q 10/0836 705/339
2016/0186470 A1 * 6/2016 Finley ................... E05C 19/182 292/339
2016/0235236 A1 * 8/2016 Byers ..................... A47G 29/14
2018/0070753 A1 * 3/2018 Eveloff ................. H04W 4/025
2020/0090175 A1 3/2020 Davis et al.
2021/0035392 A1 2/2021 Lee et al.
2021/0279680 A1 * 9/2021 Estill .................. G07C 9/00571
2021/0321807 A1 * 10/2021 Needler ............. G07C 9/00912

FOREIGN PATENT DOCUMENTS

CN 2830597 Y 10/2006
CN 204585191 U 8/2015
CN 110847725 A 2/2020
CN 211787188 U 10/2020
DE 102009020741 A1 * 11/2010 ........... E05B 47/026
DE 202018100945 U1 5/2019
DE 102019122118 A1 2/2021
FR 2773191 A1 7/1999
GB 2365607 A * 2/2002 ........... A47G 29/141
WO WO-2006071739 A2 * 7/2006 ......... G07C 9/00103
WO WO-2009112023 A1 * 9/2009 ............. E05B 47/00
WO 2014/070344 A1 5/2014
WO WO-2015078338 A1 * 6/2015 ............. A47G 29/12
WO WO-2021110861 A1 * 6/2021 ......... E05B 47/0012

OTHER PUBLICATIONS

Craftsman, Smart Lock Quickstart Setup Guide, 2021.
Carman, A., "Forget keys; use Bluetooth locks to get into your toolbox," retrieved from the Internet at <https://www.theverge.com/circuitbreaker/2016/7/27/12298504/craftsman-tool-box-bluetooth-drawer-pro-series> Jul. 27, 2016.

(56) References Cited

OTHER PUBLICATIONS

International Search Report and Written Opinion for Int. App. No. PCT/US2022/053541, mailed May 16, 2023.

* cited by examiner

JOBSITE BOX WITH KEYLESS ENTRY

CROSS-REFERENCE TO RELATED APPLICATIONS

The present application claims priority to U.S. Provisional Patent Application No. 63/291,570 filed Dec. 20, 2021. The entire disclosure contents of this application are herewith incorporated by reference into the present application.

BACKGROUND

A. Field

This disclosure relates generally to a jobsite box with keyless access, and more particularly to a jobsite box that can be locked and unlocked without using a conventional key.

B. Description of Related Art

Jobsite boxes are generally used at construction job sites and similar locations for storing tools and materials. Workers typically each have a separate set of keys to access the materials in a jobsite box, or the foreman of a project is the only person with a set of keys to access the jobsite box. Either of these alternatives could result in unwanted delays, waste of time, and waste of money and other resources. In the scenario where separate keys are allocated to each worker, if one worker loses or misplaces their set of keys, the project is required to replace the typical padlock and multiple sets of keys for each worker. In the scenario where the foreman alone is responsible for the keys to the jobsite, the risk of losing a set of keys and the cost of replacement is lessened. But, in that scenario, the foreman needs to be present to open and close the jobsite box for any of the workers to have access to their tools and begin working and to close up at the end of the day. Thus, it would be convenient to have an alternative solution for accessing a jobsite box.

SUMMARY

The following embodiments and aspects thereof are described and illustrated in conjunction with systems, tools and methods which are meant to be exemplary and illustrative, not limiting in scope.

In one aspect, a jobsite box for keyless entry is disclosed. The jobsite box includes a body, the body having an interior, an exterior, and a lid, a key pad positioned on the exterior of the body, the key pad being in communication with a controller positioned on the body, a locking mechanism connected to the body, the locking mechanism being configured to lock and unlock the jobsite box, a battery positioned in the interior of the body, the battery configured to power the locking mechanism. The controller is configured to lock or unlock the locking mechanism when a predetermined code is entered into the key pad.

In another aspect, a jobsite box for keyless entry utilizing an application on an electronic device is disclosed. The jobsite box includes a body, the body having an interior, an exterior, and a lid, a locking mechanism connected to the body, the locking mechanism being configured to lock and unlock the jobsite box, a battery positioned in the interior of the body, the battery configured to power the locking mechanism, and a controller configured to lock or unlock the locking mechanism in response to a command received from an application on an electronic device.

In addition to the exemplary aspects and embodiments described above, further aspects and embodiments will become apparent by reference to the drawings and by study of the following detailed description.

BRIEF DESCRIPTION OF THE DRAWINGS

Exemplary embodiments are illustrated in the drawings. It is intended that the embodiments and figures disclosed herein are to be considered illustrative rather than restrictive.

DETAILED DESCRIPTION

Disclosed is a jobsite work box that can be unlocked and locked without a conventional key. In some embodiments, the jobsite box may include a controller, batteries, and actuators which activate upon receiving an external command via a key pad on the outside of the box, a Bluetooth® device, or by way of Wi-Fi. The battery may be recharged from an external power supply. In case of electrical component failure, the box may be opened with a conventional key inserted into a key lock. In some embodiments, the code is required to gain access, and the code may be changed via the key pad, Bluetooth® device, or via a Wi-Fi connection. With this design, the foreman on a jobsite may unlock the box remotely to allow workers access without needing to provide workers a key or code to access the content of the jobsite box. This minimizes the likelihood of a breach of security of the jobsite box due to loss of access materials, as well as delay of time if the foreman on a jobsite cannot be present for any given reason. Further, in case the access code becomes compromised, some embodiments allow the code to be changed immediately through the remote connection.

Figure 1:
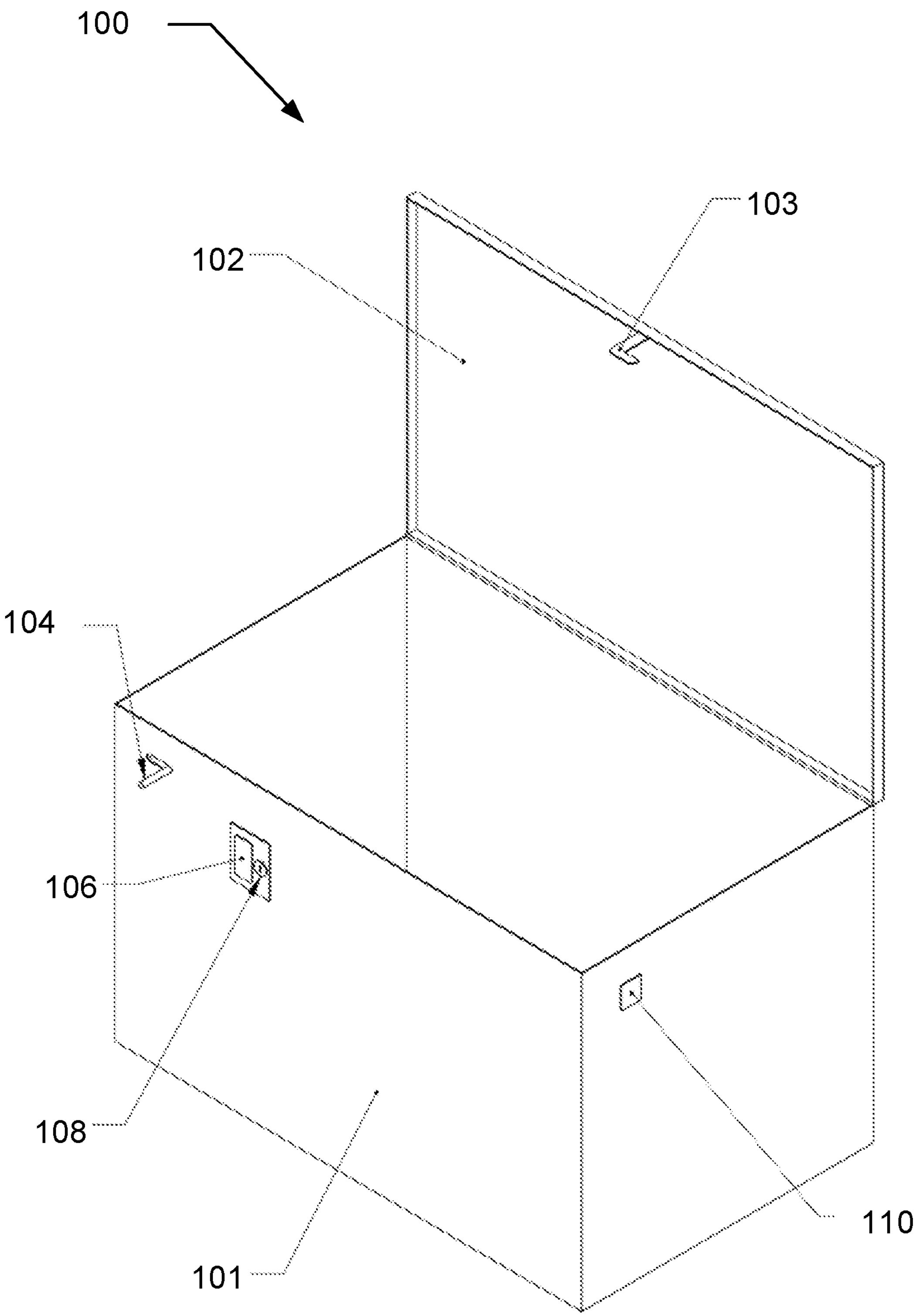
FIG. 1 is a perspective view of an example jobsite box, in accordance with an embodiment.

FIG. 1 shows an example jobsite box 100 with a body 101 and a lid 102 according to an embodiment. A handle 104 of a lock bar 200 (shown in FIGS. 2-7) protrudes through the box body 101. A key pad 106 and key lock 108 are accessible on the outside of the box 100. An external charging port 110, to which either DC or AC power may be connected, is accessible as well. The lid 102 has at least one hook 103 which engages the lock bar 200 to lock the box 100 when the lid 102 is in the closed position.

Figure 2:
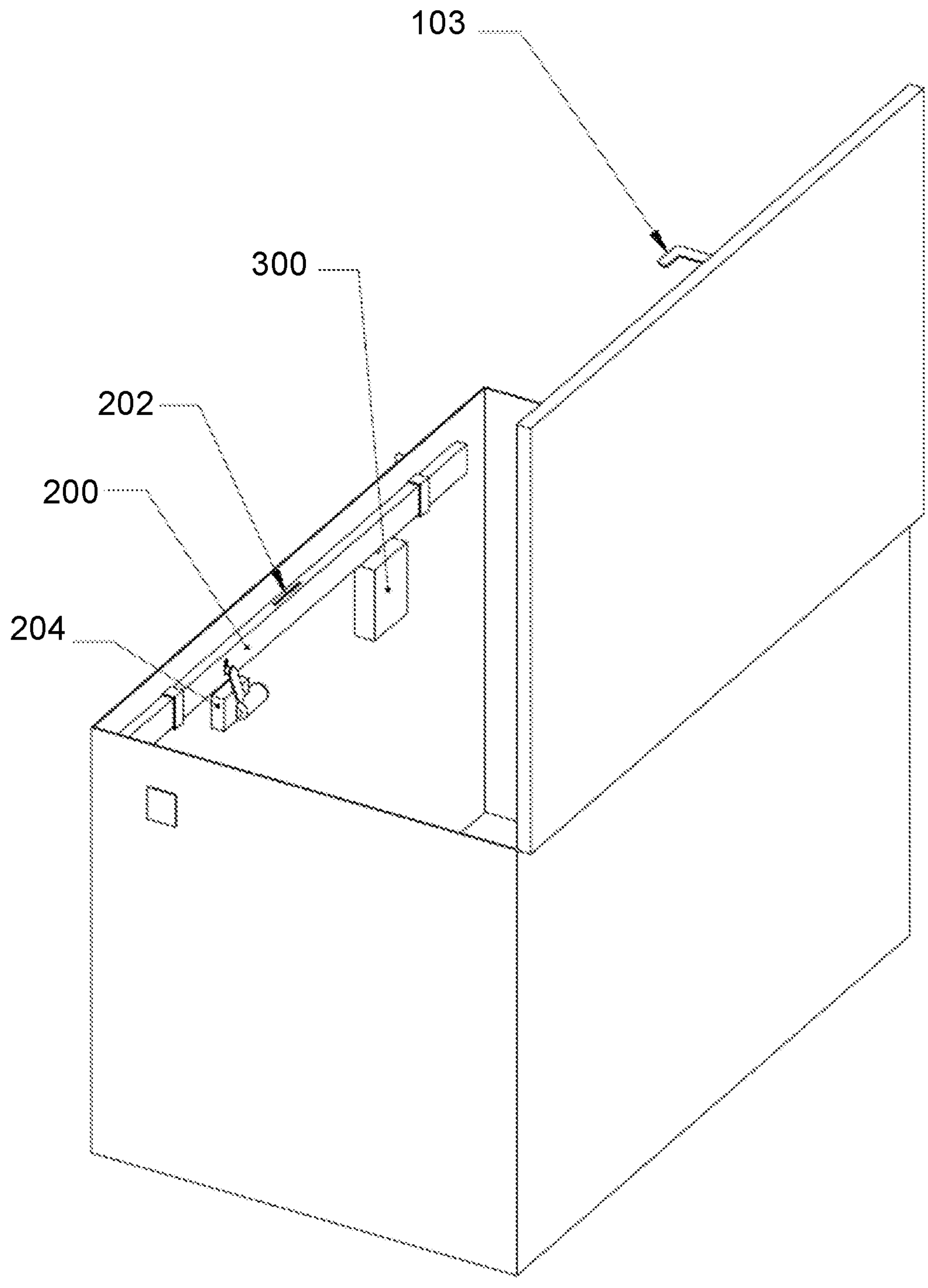
FIG. 2 is a rear perspective view of the jobsite box shown in FIG. 1, in accordance with an embodiment.
Figure 3:
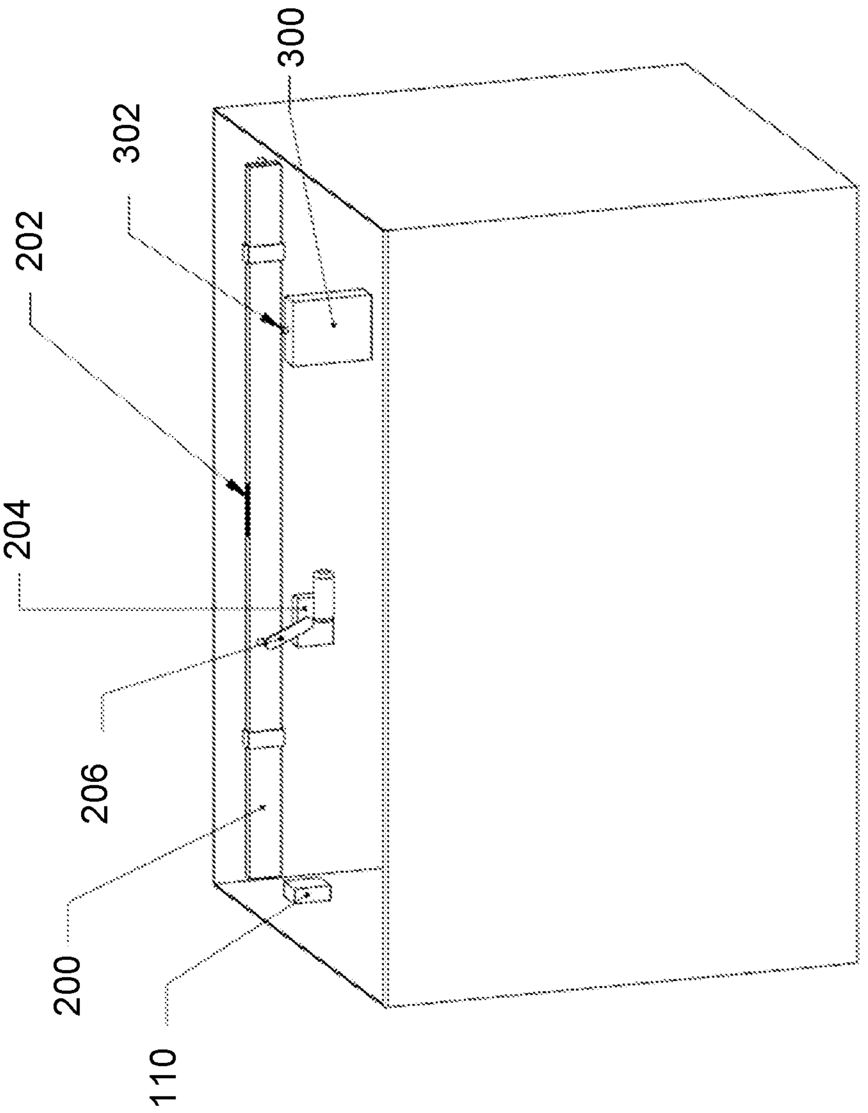
FIG. 3 is rear view of the interior of the jobsite box shown in FIG. 1, in accordance with an embodiment.

FIGS. 2 and 3 show the internal components of the jobsite box 100. The lock bar 200 is retained so that it can slide horizontally along a front wall of the box 100. The lock bar 200 may have a hook slot 202 configured to engage the hook 103 in the lid 102 when the lid is closed. The lock bar 200 is connected to a lock bar actuator 204, which may be an electric motor with a suitable gear box which can move a lever 206 to drive the lock bar 200 between its locked and unlocked positions. Other types of electro-mechanical actuators such as drive screws, solenoids, etc., could also be used. In addition, in an alternate embodiment, the lock bar actuator 204 can be omitted. In these embodiments, the controller 300 could drive the lock bolt 302 to disengage the lock bar 200, but movement of the lock bar 200 to and from the unlocked position is done manually by means of the lock bar handle 104.

A controller 300 may be positioned on the front wall of the box 100, on the internal portion of the externally accessible key pad 106 and the key lock 108. In some embodiments, the controller 300 may be a stand-alone device, separate from the key pad 106 and the key lock 108.

As shown in FIGS. 3-6, a lock bolt 302 projects upwardly from the controller 300, and is configured to engage the lock bar 200 when extended. The lock bolt 302 may be moved between engaged and disengaged positions by the electric motor or solenoid within the controller 300. The controller 300 may control the proper sequencing of the lock bolt 302 and lock bar 200 movements. In some embodiments, the controller 300 may be commanded to begin an unlocking or locking sequence by any or all of several ways. A first way of initiating the controller 300 into operation could be a user entering a code on the key pad 106. A second way of initiating the controller 300 into operation could be via hand-held device with Bluetooth® capability that may be used to communicate with the controller 300 from a distance of several yards. A third way of initiating the controller 300 into operation could be via an app on a cell phone, tablet, computer, or other similar device that can be used to communicate with the controller 300 via Wi-Fi from virtually any distance. Further, the code required to activate the controller 300 can be changed by the key pad, the Bluetooth® device, or by the cell phone or other similar device.

Figure 4:
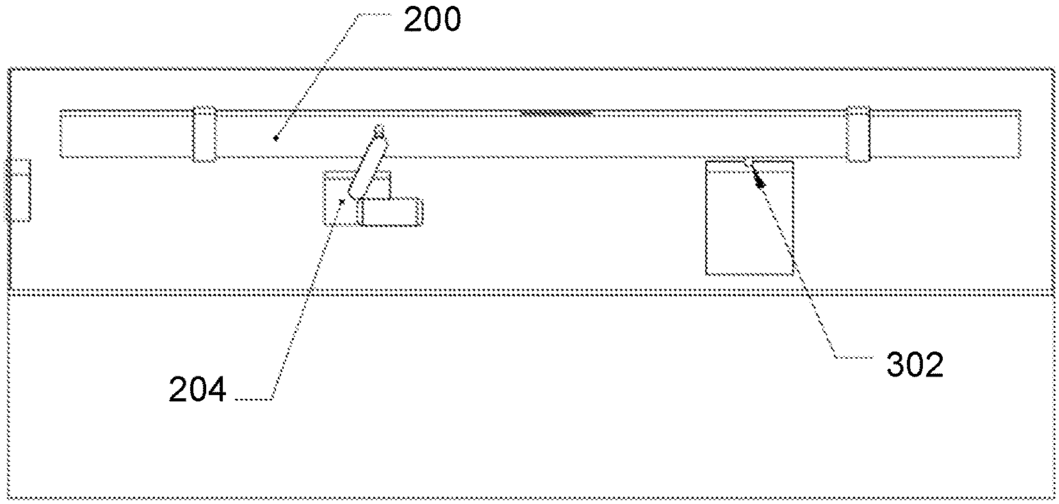
FIGS. 4, 5, and 6 are views of a lock bar positioned on the interior of the jobsite box shown in FIG. 1, in accordance with an embodiment.
Figure 5:
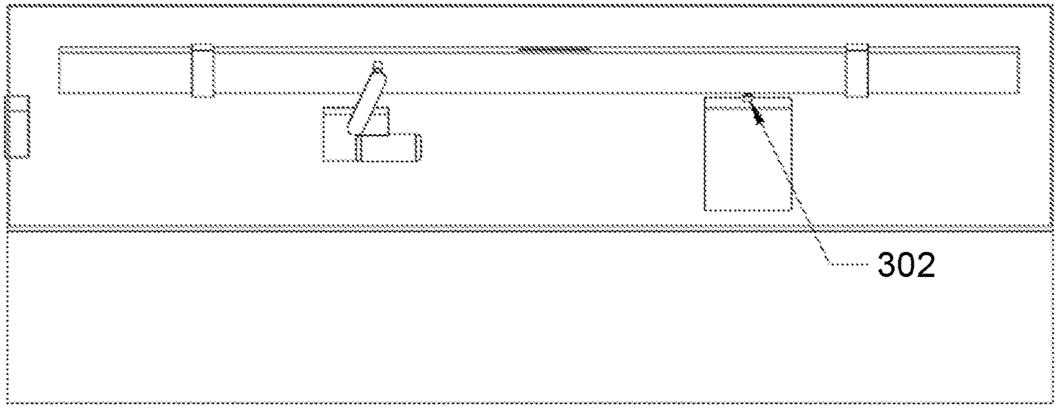
Figure 6:
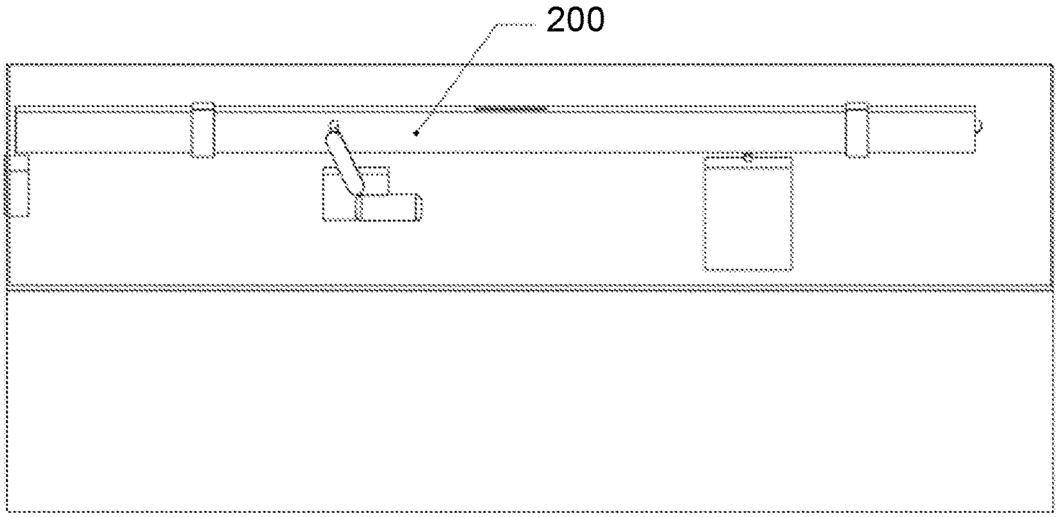

FIGS. 4-6 show the lock bar 200 moving from the locked position to the unlocked position. In this example, both the lock bolt 302 and the lock bar 200 are driven by actuators, such as the lock bolt actuator 304 and the lock bar actuator 204, so the user need only move the lid 102 manually after the unlocking sequence has been completed.

Once the lock bolt 302 is disengaged from the lock bar 200, the lock bar 200 can be moved to its unlocked position, which allows the hook 103 on the lid 102 to disengage from the lock bar 200, and the lid 102 to be opened.

Figure 7:
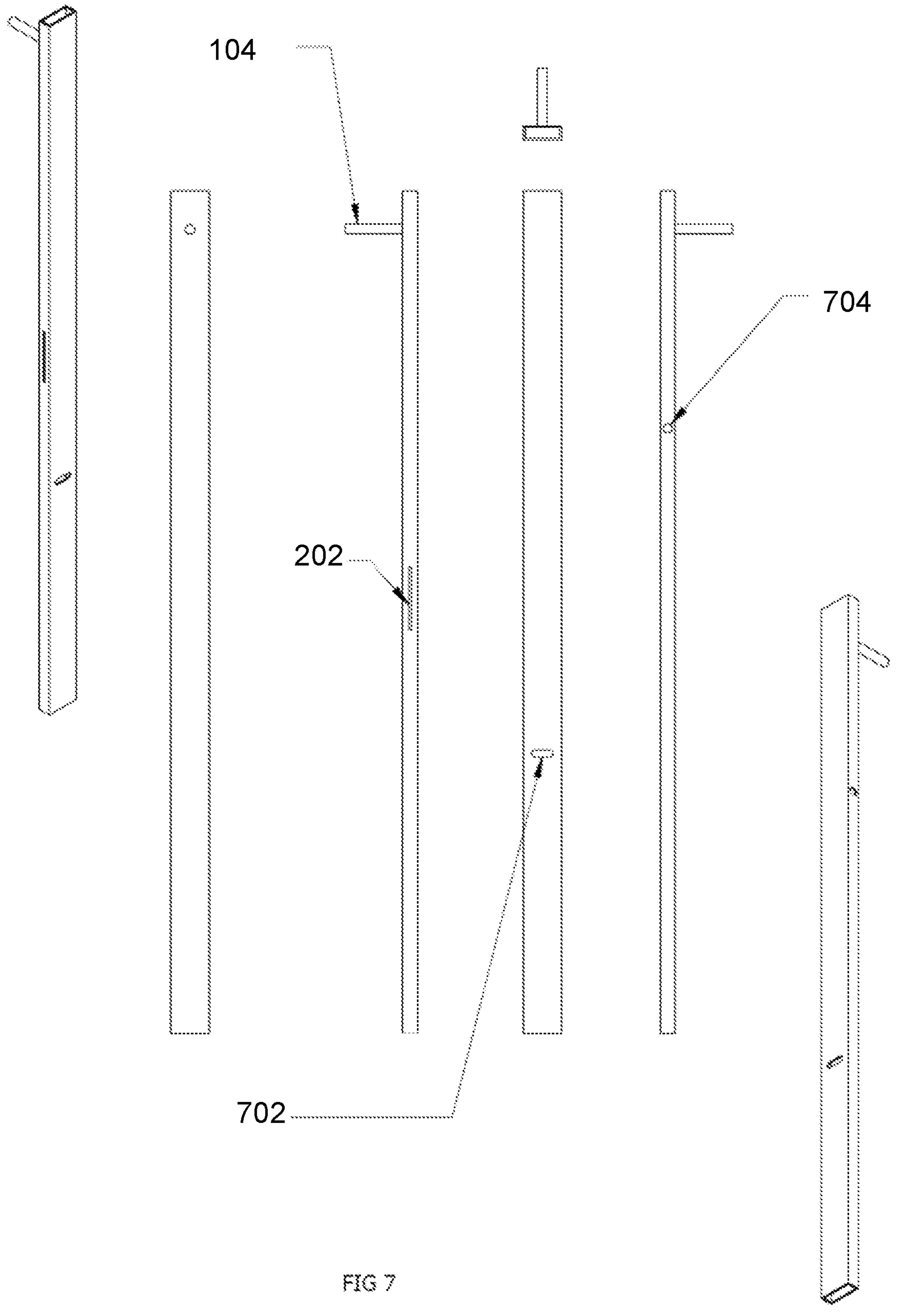
FIG. 7 is an expanded view of the lock bar shown in FIGS. 4-6, in accordance with an embodiment.

To lock the box 100, beginning with the lid 102 shut, the steps are performed in reverse order. The lock bar 200 is moved by the lock bar actuator 204 into its locked position which captures the hook 103 on the lid 102. Then the lock bolt 302 is extended by the lock bolt actuator 304 to engage the lock bar 200 to prevent the lock bar from moving. FIG. 7 shows the components of the lock bar 200 in detail, including actuator lever slot 702 and lock bolt hole 704.

Figure 8:
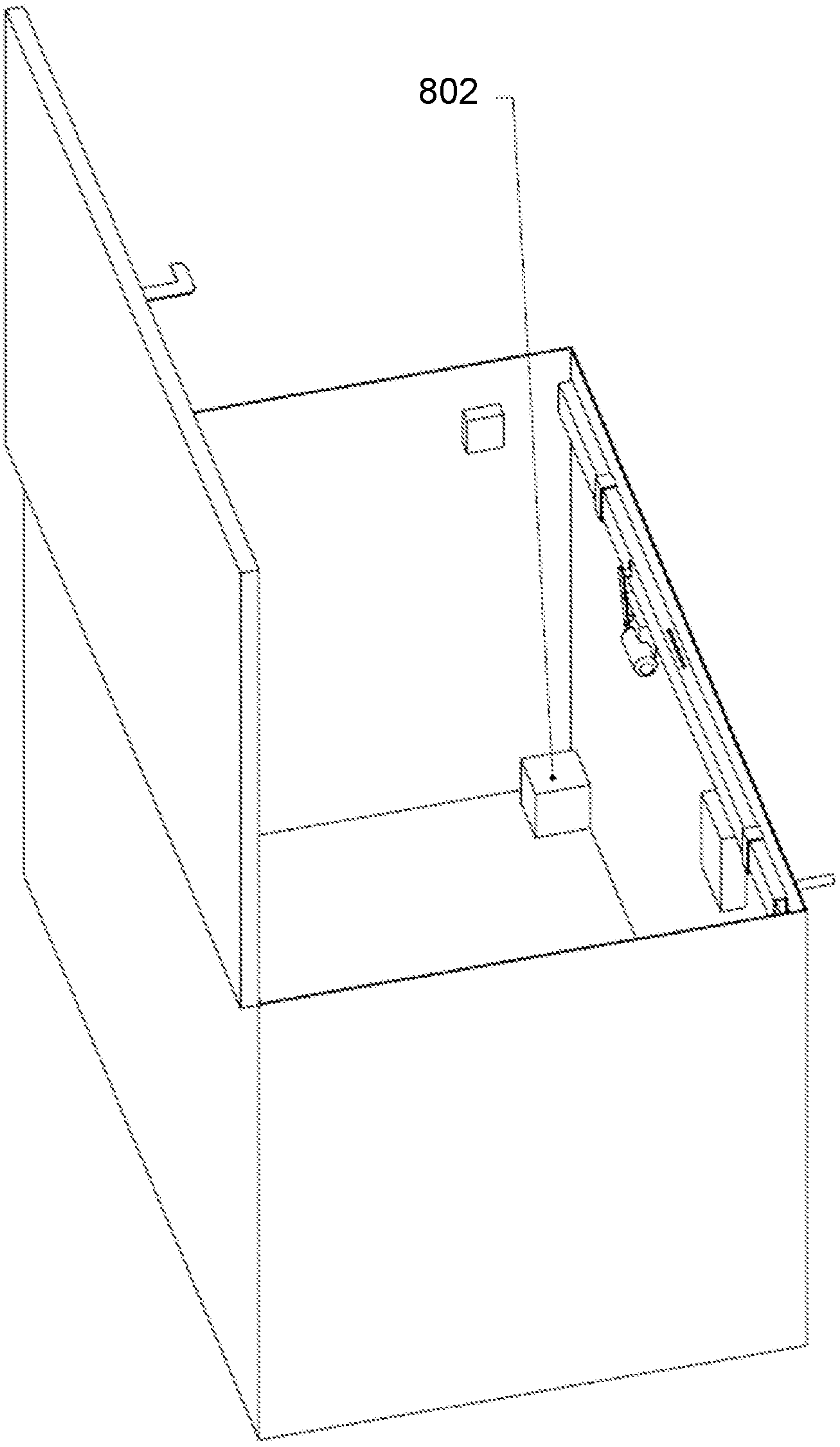
FIG. 8 is a view of the interior of the jobsite box shown in FIG. 1, in accordance with an embodiment.
Figure 10:
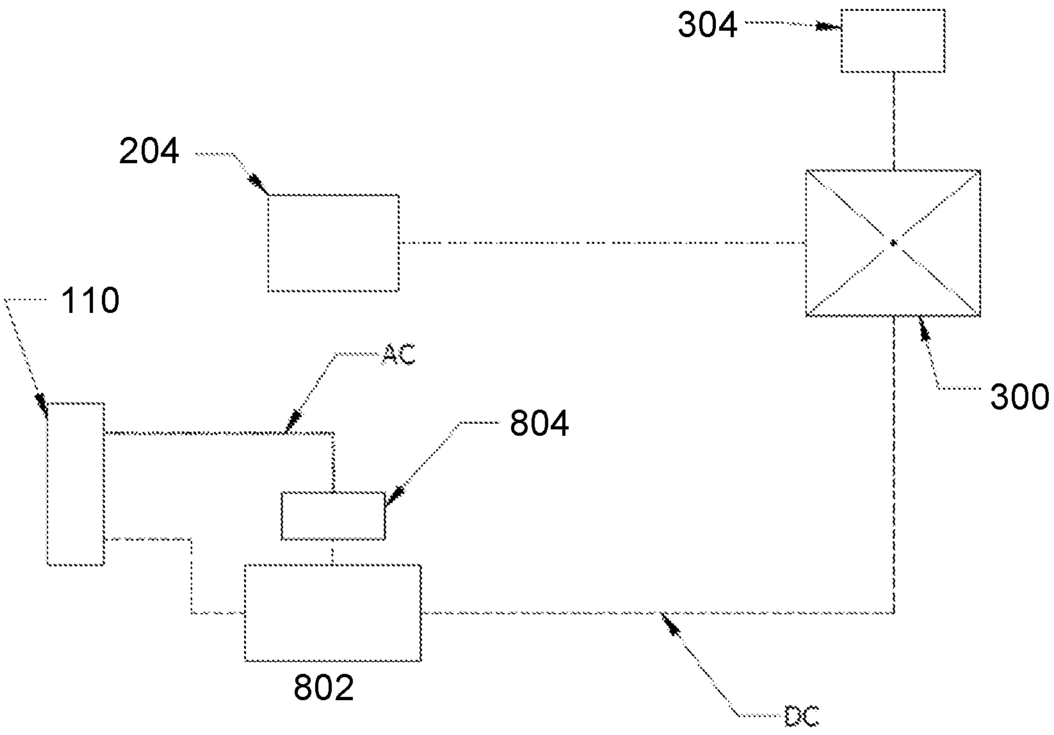
FIG. 10 is a circuit diagram of the electrical components of the jobsite box, in accordance with an embodiment.

FIG. 8 shows an internal battery 802, which can also include a charger 804 (shown in FIG. 10). The battery 802 may have enough capacity to power the controller 300, the lock bolt actuator 304, and the lock bar actuator 204 for a useful number of locking and unlocking sequences. The charger 804 may be used to recharge the battery 802 when AC power is connected to the external charging port 110. Alternatively, DC power applied at the external charging port 110 may recharge the battery 802 directly. In the event that the battery 802 has been drained while the lid 102 is locked shut, the external charging port 110 can be used to recharge the battery 802 and permit the lid 102 to be opened keylessly in the usual way. However, in the event that there is a complete electrical failure of the battery 802, controller 300, and actuators, a standard key can be inserted into the key lock which when turned will override the controller 300 and disengage the lock bolt 302 from the lock bar 200. At this point, the lock bar handle 104 can be used to manually slide the lock bar 200 to the unlocked position so that the lid 102 may be opened.

Figure 9:
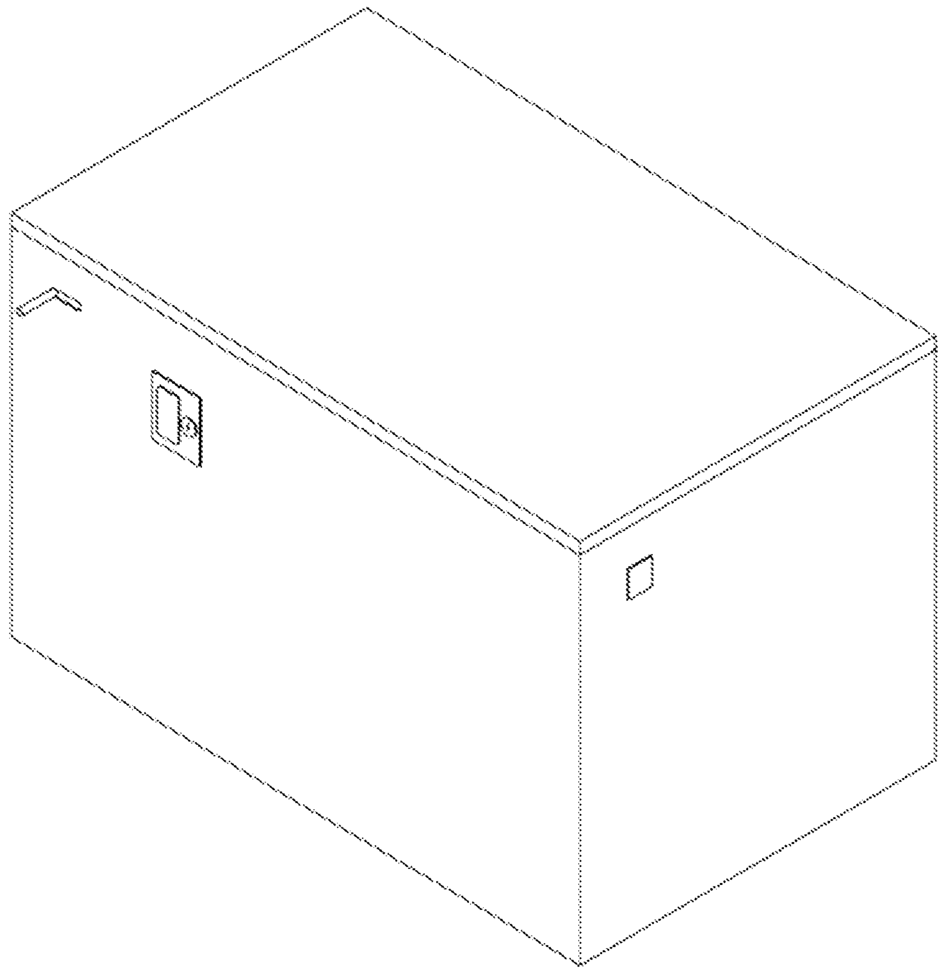
FIG. 9 shows the jobsite box of FIG. 1 in a closed position, in accordance with an embodiment.

FIG. 9 shows the lid 102 in a closed position and the lock bar 200 in the locked position. In this position, the hook 103 on the lid 102 is engaged by the hook slot 202 in the lock bar 200 and the lid 102 cannot be opened. The lock bolt 302 is engaged with the lock bar 200 and prevents the lock bar from moving.

FIG. 10 shows a simple circuit diagram of the key electrical components. The charger 804 may be used to recharge the battery 802 when AC power is connected to the external charging port 110. Alternatively, DC power applied at the external charging port 110 may recharge the battery 802 directly. Further, the battery 802 may have enough capacity to power the controller 300 and the lock bolt actuator 304 and the lock bar actuator 204 for a useful number of locking and unlocking sequences.

Figure 11:
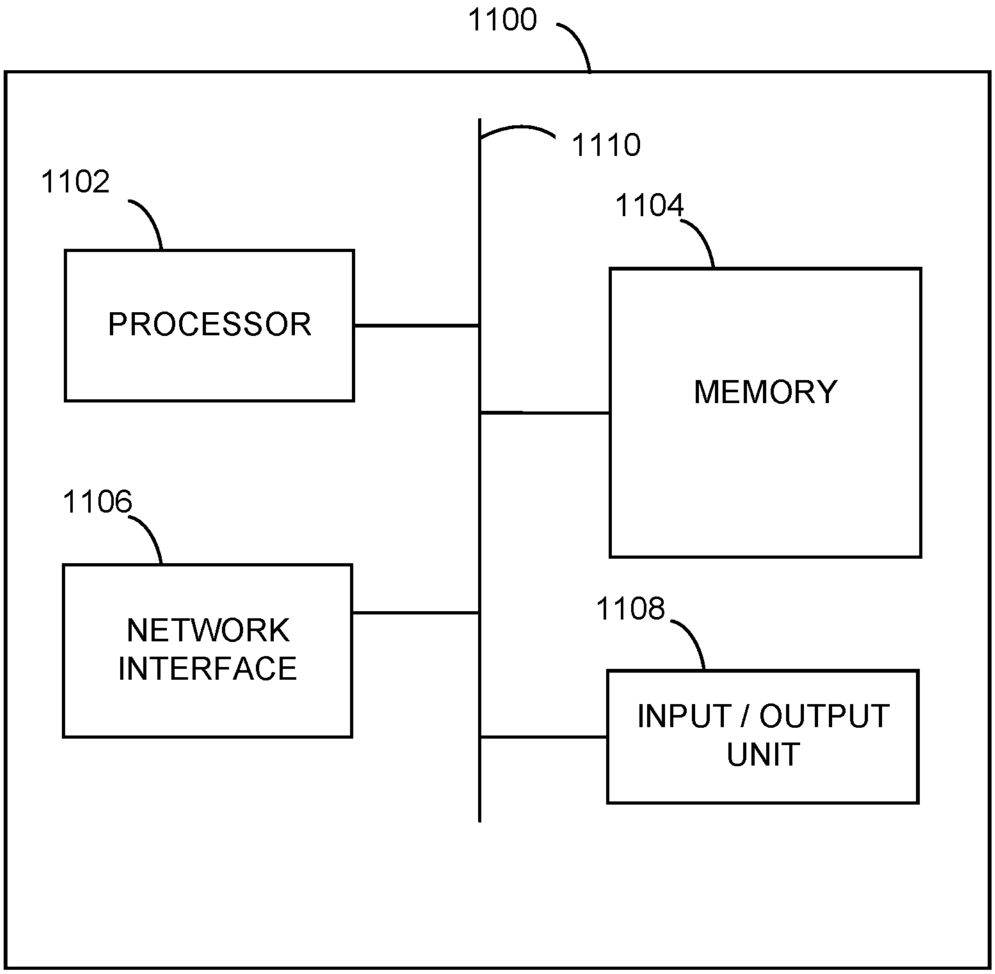
FIG. 11 is a schematic drawing of an example computing device, in accordance with an example embodiment.

FIG. 11 shows a simple schematic drawing of a computing device 1100 that may be arranged to operate in accordance with the embodiments herein. Computing device 1100 could be any type of computational platform. In this example, computing device 1100 includes processor 1102, memory 1104, network interface 1106, and an input/output unit 1108, all of which may be coupled by a system bus 1110 or a similar mechanism. In some embodiments, computing device 1100 may include other components and/or peripheral devices.

Network interface 1106 may take the form of one or more wireline interfaces, such as Ethernet. Network interface 1106 may also support communication over one or more non-Ethernet media, such as coaxial cables or power lines, or over wide-area media, such as Synchronous Optical Networking (SONET) or digital subscriber line (DSL) technologies. Network interface 1106 may additionally take the form of one or more wireless interfaces, such as Wi-Fi, Bluetooth®, global positioning system (GPS), or a wide-area wireless interface. However, other forms of physical layer interfaces and other types of standard or proprietary communication protocols may be used over network interface 1106. Furthermore, network interface 1106 may include Ethernet, Bluetooth®, and Wi-Fi interfaces.

In some embodiments, computing device 1100 may be integrated with the controller 300 and configured to receive inputs from electronic devices, such as mobile cellular phones, laptops, or personal handheld devices.

It should be understood that in some embodiments, the key pad 106 and/or the key lock 108 and/or the lock bar actuator 204 may not be present, and jobsite box would be locked and unlocked only with a Bluetooth® device or a cell phone app. In this embodiment, there would be no mechanism to enable unlocking of the box in the case of complete internal electrical failure.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A jobsite box comprising:

a body, the body having an interior, an exterior, and a lid;

a key pad positioned on the exterior of the body, the key pad being in communication with a controller positioned on the body;

a locking mechanism connected to the body, the locking mechanism having a lock bar actuator on the interior of the body configured to move a lever to drive a lock bar, a lock bolt actuator on the interior of the body configured to drive a lock bolt to engage the lock bar to lock the jobsite box, and a lock bar handle extending through the body and configured to move the lock bar; and a battery positioned in the interior of the body, the battery configured to power the lock bar actuator, the lock bolt actuator, and the controller, wherein the controller is configured to te lock or unlock the locking mechanism when a predetermined code is entered into the key pad.

2. The jobsite box of claim 1, wherein the predetermined code is configured to be changed by the key pad, a device with Bluetooth® capability, or an electronic device with Wi-Fi capability.

3. The jobsite box of claim 1, wherein the locking mechanism comprises a hook slot provided within the lock bar, wherein the hook slot engages a hook positioned on the lid when the lid is closed.

4. The jobsite box of claim 1, wherein the lock bar actuator comprises a motor, and wherein the locking mechanism is further configured to drive the lock bar between a locked position and an unlocked position.

5. The jobsite box of claim 1, wherein the controller is integral with the key pad.

6. The jobsite box of claim 1, wherein the controller is separate from the key pad.

7. The jobsite box of claim 1, wherein the controller is further configured to lock or unlock the locking mechanism in response to a command received by a signal from a device with Bluetooth® capability.

8. The jobsite box of claim 1, wherein the controller is further configured to lock or unlock the locking mechanism in response to a command received by a signal from an electronic device with Wi-Fi capability.

9. The jobsite box of claim 1, wherein the battery is a rechargeable battery, and the jobsite box further comprising a charger for charging the battery.

10. The jobsite box of claim 1, further comprising a charging port positioned on the exterior of the jobsite box.

11. The jobsite box of claim 1, further comprising a key lock positioned on the exterior of the body, the key lock being configured to receive a key to override the controller.

12. A jobsite box comprising:

a body, the body having an interior, an exterior, and a lid;

a locking mechanism connected to the interior of the body, the locking mechanism having a lock bar actuator and a lock bolt actuator configured to drive a lock bolt to engage a lock bar to lock the jobsite box;

a controller configured to initiate and control sequencing of locking or unlocking the locking mechanism in response to an access code provided remotely via an application on an electronic device, wherein the access code is configured to be changed remotely via the application; and a battery positioned in the interior of the body, the battery configured to power the lock bar actuator, the lock bolt actuator, and the controller.

13. The jobsite box of claim 12, wherein the electronic device is a device with at least one of Bluetooth® capability or Wi-Fi capability.

14. The jobsite box of claim 12, further comprising a charger for charging the battery.

15. The jobsite box of claim 12, further comprising a charging port positioned on the exterior of the jobsite box.

16. The jobsite box of claim 12, wherein the controller is positioned on the interior of the body.

17. The jobsite box of claim 12, wherein the locking mechanism comprises a lock bar handle, and the lock bar having a hook slot, wherein the hook slot engages a hook positioned on the lid when the lid is closed.

18. The jobsite box of claim 12, wherein the locking mechanism comprises a lock bar handle, the lock bolt, and the lock bar, wherein the lock bar handle is configured to move the lock bar when the locking mechanism is unlocked.

19. The jobsite box of claim 12, wherein the locking mechanism comprises the lock bar actuator configured to drive the lock bar between a locked position and an unlocked position.

* * * * *